United States Patent [19]

Bissell

[11] Patent Number: 5,015,046
[45] Date of Patent: May 14, 1991

[54] FLUID CONTROL DEVICE AND BRAKING SYSTEM

[75] Inventor: Martin Bissell, Birmingham, Great Britain

[73] Assignee: Lucas Industries Public Limited Company, Birmingham, England

[21] Appl. No.: 355,350

[22] Filed: May 23, 1989

[30] Foreign Application Priority Data

May 25, 1988 [GB] United Kingdom ............... 8812360

[51] Int. Cl.[5] .............................................. B60T 13/68
[52] U.S. Cl. ...................................... 303/118; 303/61; 303/113; 303/115
[58] Field of Search ............... 303/113, 116, 119, 118, 303/115, 10, 61, 50, 51, 32, 37

[56] References Cited

U.S. PATENT DOCUMENTS

| | | | |
|---|---|---|---|
| 2,919,162 | 12/1959 | Roberts | 303/118 |
| 3,768,519 | 10/1973 | Morse | 303/118 |
| 3,854,501 | 12/1974 | Machek | 303/113 |
| 3,881,779 | 5/1975 | Machek | 303/118 |
| 3,920,046 | 11/1975 | Morse et al. | 303/118 |
| 4,580,849 | 4/1986 | Farr | 303/118 |
| 4,811,994 | 3/1989 | Friedow | 303/115 |
| 4,838,622 | 6/1989 | Kircher et al. | 303/61 X |

FOREIGN PATENT DOCUMENTS

| | | | |
|---|---|---|---|
| 1916662 | 10/1970 | Fed. Rep. of Germany | 303/113 |
| 3413759 | 10/1985 | Fed. Rep. of Germany | 303/118 |
| 8058 | 1/1988 | Japan | 303/113 |

Primary Examiner—Matthew C. Graham
Attorney, Agent, or Firm—Fleit, Jacobson, Cohn, Price, Holman & Stern

[57] ABSTRACT

A fluid control device for a braking system has a fluid flow path between an inlet port (9) and an outlet port (10) controlled by a first valve (17,18), and a fluid flow path between the outlet port (10) and an exhaust port (11,12) controlled by a second valve (20,22) and a stepper motor (30) actuated by an electronic controller (2) for driving a valve control piston (22) to which a pilot inlet pressure is applied (23) according to driver braking demand (5A). The stepper motor (30) and pilot inlet pressure act in parallel on piston (22) to control operation of the valves and thereby regulate braking. The stepper motor may operate in response to one or more vehicle operational parameters (A,B,C,D) fed to the controller (7).

17 Claims, 3 Drawing Sheets

FIG. I.

FLUID CONTROL DEVICE AND BRAKING SYSTEM

BACKGROUND OF THE INVENTION

This invention relates to a fluid control device for use in a fluid-operated braking system, primarily for a motor vehicle, the control device being of the general kind in which first and second valves are operatively inter-related and respectively arranged to control fluid flow in a first flow path between fluid inlet and outlet ports and a second flow path through an exhaust port. The invention also embraces a braking system incorporating the aforesaid fluid control device.

Some conventional control devices of this general kind employ solenoids operated by pulsed control techniques in order to produce rapid valve switching. Such control devices tend to be relatively heavy and robust in order to withstand the necessary switching and can therefore be costly. They also have the disadvantage that they cannot readily provide proportional control of fluid output for brake application.

BRIEF SUMMARY OF THE INVENTION

An object of the present invention is to provide a simple and convenient fluid control device of the aforesaid general kind which is capable of very flexible operation under the selective control of a variety of parameters, and also to provide a braking system incorporating such a device.

According to the invention, a fluid control device of the aforesaid general kind comprises a valve control member the movement of which is controlled by an electrical stepper motor operable, in use, in response to a control signal.

In one convenient arrangement, the valve control member is operatively associated with a piston subject to a control pressure acting in parallel with the stepper motor to operate the valve control member.

Preferably, the control member is driven by the stepper motor via resilient means which may conveniently be in the form of a spring interposed between a device driven linearly by rotation of the stepper motor and the control member.

Typically, part of one of the valves is on a valve element which carries a part of the other valve, the arrangement being such that one of the valves is closed by movement of the valve control member into engagement with the valve element, and further movement of the valve control member causes displacement of the valve element to open the other valve.

From another aspect of the invention, a fluid-operated braking system comprises a source of pressurized fluid connected to a fluid inlet port of a fluid control device, one or more brake actuators connected to a fluid outlet port of the control device, the device defining a fluid flow path between the inlet and outlet, a first valve normally interrupting the flow path, a second valve associated with an exhaust port, a valve control member driven by an electrical stepper motor, and an electronic controller adapted to receive electrical signals representative of operator demand and/or one or more operational parameters and to supply a corresponding motive signal to the stepper motor which drives the valve control member to cause actuation of the valves and thereby control operation of one or more brake actuators.

The valve control member is conveniently operatively associated with a piston which is subject to a control pressure supplied to the control device, preferably from a user-operated control valve, the force of the pressure acting in parallel with the stepper motor to operate the valve control member.

Typically, the user-operated valve is operated by control means, such as a pedal or lever, and this may conveniently operate a transducer device to provide an electrical signal representative of the operative displacement of the control means, such signal being fed to the controller to modify the motive signal supplied to the stepper motor.

BRIEF DESCRIPTION OF THE DRAWINGS

The invention will now be described, by way of example, with reference to the accompanying drawings in wherein.

DETAILED DESCRIPTION

Figure 1:
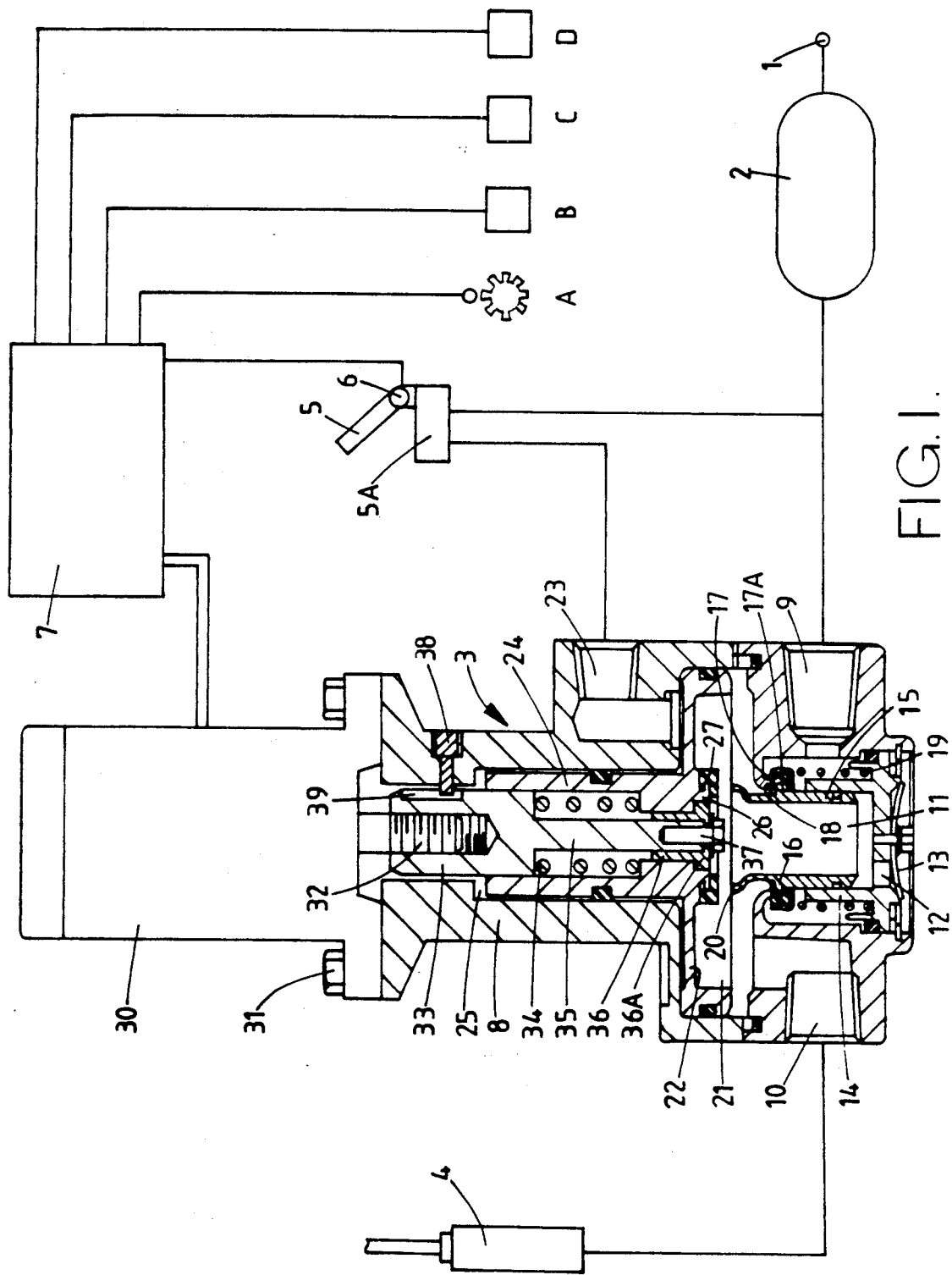
FIG. 1 is a cross-sectional view of one form of fluid control device incorporated in a fluid pressure operated braking system in accordance with the invention.

Referring to FIG. 1, this shows an air-operated vehicle braking system in which pressurized air is supplied from a pump 1 into an air reservoir 2, from which it is supplied via a fluid control device, indicated generally at 3, to one or more brake actuators represented at 4. Actuation of the system is effected by a driver-operated pedal 5 which operates a transducer 6, from which an electrical output varying with pedal displacement and-/or load is supplied to an electronic controller 7. The pedal also operates an actuator valve 5A which supplies a pilot air signal to the control device 3, as will be described in more detail hereafter.

The control device 3 has a body 8 having a fluid inlet 9 connected to the air reservoir 2, a fluid outlet 10 connected to the brake actuator 4 and an exhaust passage 11 leading to an exhaust port 12 covered by a conventional flap valve 13. The passage 11 is partly defined by an internal upstanding cylindrical part 14 of the body within which slides a generally cylindrical valve member 15 having a surrounding radial flange 16 which carries a resilient valve element 17 held in position by a retainer cap 17A. The valve element co-operates with a seat 18 surrounding the entrance to the passage 11. The valve member 15 is urged by a spring 19 towards its illustrated position in which the valve element 17 engages the seat 18 and prevents communication between the fluid inlet 9 and fluid outlet 10. The free inner end portion of the valve member 15 is of slightly larger diameter than the remainder thereof and forms a further valve seat 20.

The body 8 forms a chamber 21 within which slides a piston 22 under the action of a pilot air pressure supplied via the valve 5A to an inlet 23. The piston has a hollow upstanding central stem 24 which slides in sealing engagement within a bore 25 of the body which is of reduced diameter compared with the chamber 21. An axially projecting central part 26 of the piston carries a resilient valve element 27 for co-operation with the seat 20, in the manner to be described.

On the upper end of the body 8, as seen in the drawing, there is mounted a stepper motor unit 30 secured to the body by way of bolts 31. A reversibly threaded output shaft 32 of the motor is engaged with a corresponding thread formed within a thrust member 33 slidable within the stem portion 24 of the piston 22. Rotation of the shaft 32 produces axial movement of the thrust member 33 which is transmitted to the piston via a spring 34 surrounding a reduced diameter stem 35 of the member 33 and acting between oppositely facing surfaces of respective shoulders formed on the member 33 and piston portion 24. The stem 35 is slidably supported within the piston by way of a collar 36 engaged in the annular space between the stem and piston portion 24, the stem being attached to the collar by means of a screw 37. The member 33 is prevented from rotating within the body by a radial key 38 engaging a longitudinal slot 39 formed in the member 33.

Pressure upon the pedal 5 operates the valve 5A and admits a pilot air signal through the inlet 23 for application to the piston 22. Actuation of the pedal 5 also causes the transducer 6 to produce an electrical signal proportional, for example, to pedal displacement and/or applied load and this is fed to the controller 7, possibly along with one or more additional signals representative of vehicle operational parameters, these being provided by appropriate sensors represented at A, B, C and D. The parameters may be respectively, for example, wheel speed, vehicle acceleration or deceleration, axle or suspension link load and vehicle inclination. The controller is programmed to process the input signals, using a suitable algorithm, the resulting pulsed output being fed to the stepper motor 30, of which the output shaft 32 rotates through a corresponding angular distance. This causes the member 33 to move inwardly, applying drive via the spring 34 to the piston 22, in parallel with the force on the latter resulting from the pilot pressure input at 23, and the valve element 27 is thereby caused to engage the valve seat 20 and isolate the brake 4 from the exhaust passage 11 and exhaust port 12.

Continued inward displacement of the member 24 under the action of the pilot pressure at 23 and/or resulting from additional rotation of the motor by a signal from the controller 7, causes the valve member 15 to be displaced downwardly thereby moving the valve element 17 away from the seat 18. This action places the pressure inlet and outlet ports 9 and 10 in communication with each other and allows the brake actuator 4 to be supplied with actuating air from the accummulator 2. With the valve member 15 thus displaced, the increasing air pressure in the brake actuator is also applied to the underside of the piston 22 which moves upwardly to allow the valve element 17 once more to engage the seat 18 and isolate the brake actuator from the accummlator 2. This action occurs cyclically as the pilot input pressure and/or motor displacement increases, enabling a proportional output pressure to be applied to the actuator. Decreasing input force from the pilot air supply or stepper motor allows the piston 22 to move upwardly away from the valve member 15 under the action of the brake air pressure and thereby allow excess brake air pressure to exhaust through the exhaust port 12. During normal brake application and release, the collar 36 simply moves with the member 33 relative to the piston 22 in either direction, without operative effect.

The air pressure acting on the piston against the action of the spring 34 results in some compression of the spring 34 occurring when the motor operates to displace the valve element 17 from the seat 18 to increase the braking pressure supplied to the actuator. Flexibility of control is thus obtained as a function of the relationship between the stiffness of spring 34 and the thread pitch of the reversible threaded connection between the motor shaft 32 and thrust member 33. Since the thread pitch is fixed, the motor will be required to turn more or less, depending upon the stiffness of the spring 34, in order to produce a corresponding increase or decrease in output pressure.

As well as providing an extremely accurate metering of brake actuating pressure as a function of driver demand at the pedal 5, the use of the stepper motor 30 in the valve of the invention enables the braking pressure to be modulated in response to any one or a combination of the parameters from sensors A, B, C and D. The parameters may be respectively, for example, wheel speed, vehicle acceleration or deceleration, axle or suspension link load and vehicle inclination.

For example, upon receipt by the controller 7 of a wheel speed signal from the sensor A indicating an incipient skid condition at a wheel of the vehicle, modulation of the brake air pressure is effected, in accordance with the control algorithm, by adjusting the input force on the piston 22 generated by the motor. For this purpose, the motor rotates in a manner such as to retract the thrust member 33 in opposition to the driver's demand signal, causing the collar 36 to move into the piston to its illustrated position in which a flange 36A of the collar abuts a facing surface of the piston. The thrust member then pulls the piston upwardly, via the collar 36, away from the valve seat 20. This causes the brake air pressure to be dumped rapidly to atmosphere through the exhaust port 12, thereby releasing the brake and enabling the wheel to recover from the skid condition. The controller 7 may be programmed to cause the motor to adopt appropriate brake re-apply rates so as to avoid possible over-reaction of the system which could lead to the wheel entering an established skid condition.

Figure 2:
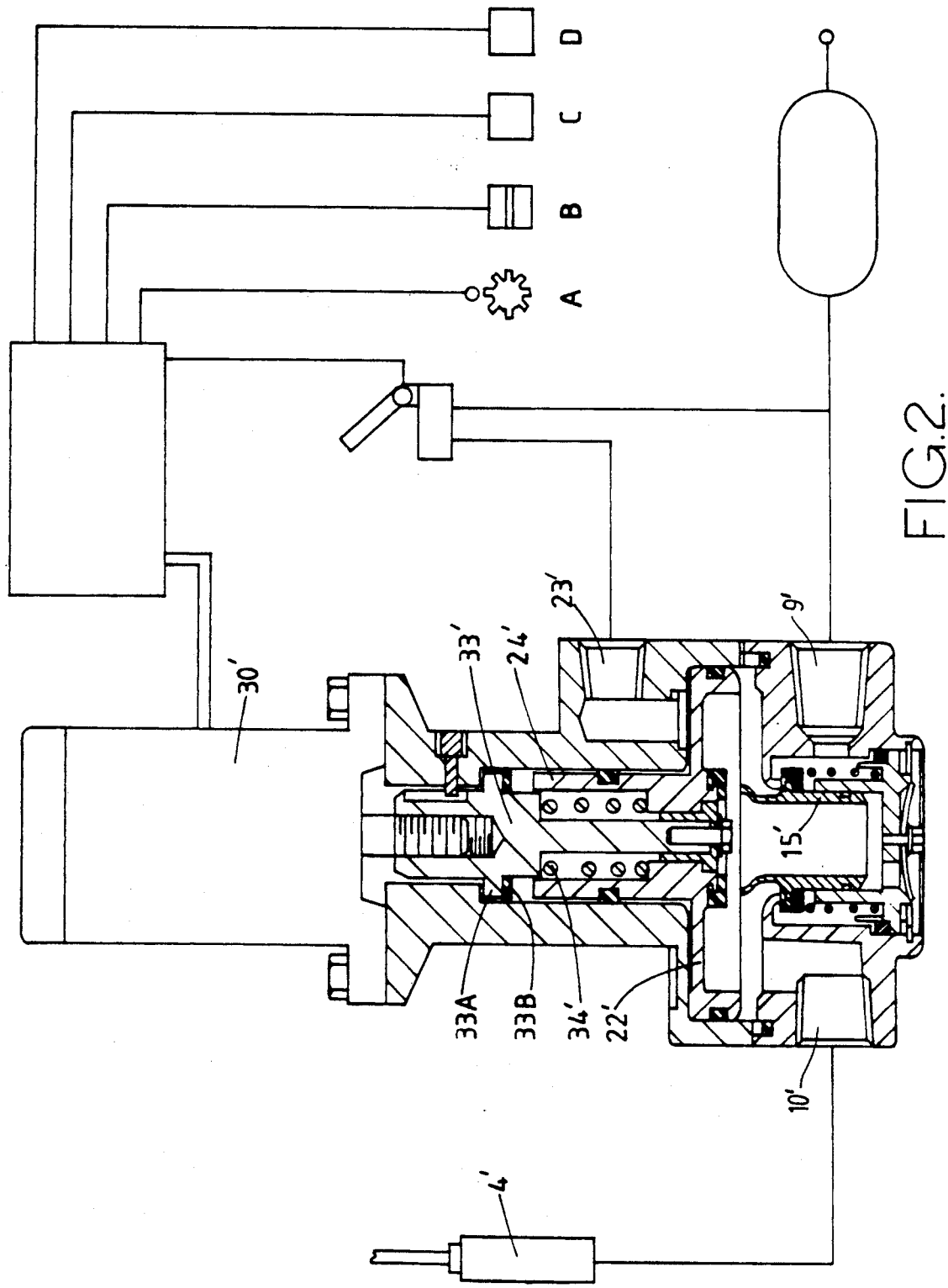
FIG. 2 is a view similar to FIG. 1 illustrating a braking system with an alternative embodiment of the fluid control device.

The embodiment of FIG. 2 is essentially similar to that of FIG. 1 and employs a stepper motor 30' to drive a thrust member 33' which acts via a spring 34' on a piston 22', to which a pilot air signal is applied via an inlet 23'. In this embodiment, however, the thrust member is additionally provided with a radial flange 33A which is normally spaced from the upper end of the piston stem 24', the inwardly facing surface of the flange having a facing 33B of resilient material.

The normal operation of this embodiment is the same as that of the FIG. 1 arrangement. However, in the event of a failure of the pilot signal at the inlet 23', or that it should be necessary to supply a very high air pressure to the brakes, such as that required to operate in a "hill hold" or "traction control" mode for example, the controller rotates the motor to move the member 33' against the action of the spring 34' and bring the facing 33B on flange 33A into contact with the stem 24'. Continued rotation of the motor in the same direction then urges the valve member 15' downwardly and allows full air pressure from the inlet 9' to be applied to the brake actuator 4'. The resilience of the facing 33B provides a degree of flexibility of operation of the motor during the time the spring 34' is inoperative. The braking pressure, during normal operation may again be modified according to operational/parameters derived from sensors A, B, C and D, as described in connection with FIG. 1.

An important feature of the air systems described above is that, in the event of an electrical failure, the pilot air pressure signal at the inlet 23, 23' can generate a sufficient output brake pressure on the piston 22, 22' to enable the piston to pull the thrust transmission member 33, 33' downwards against the resistance of the reversible thread connection at the shaft 32, to close the exhaust valve and thereby permit efficient brake actuation to be maintained. Conversely, a pilot air supply failure can trigger the controller to cause an immediate and rapid wind-down by the motor 30 of the valve control member 33, 33' in order to open the valve element 17 and permit the actuator 4 to be pressurized from the accummulator.

Figure 3:
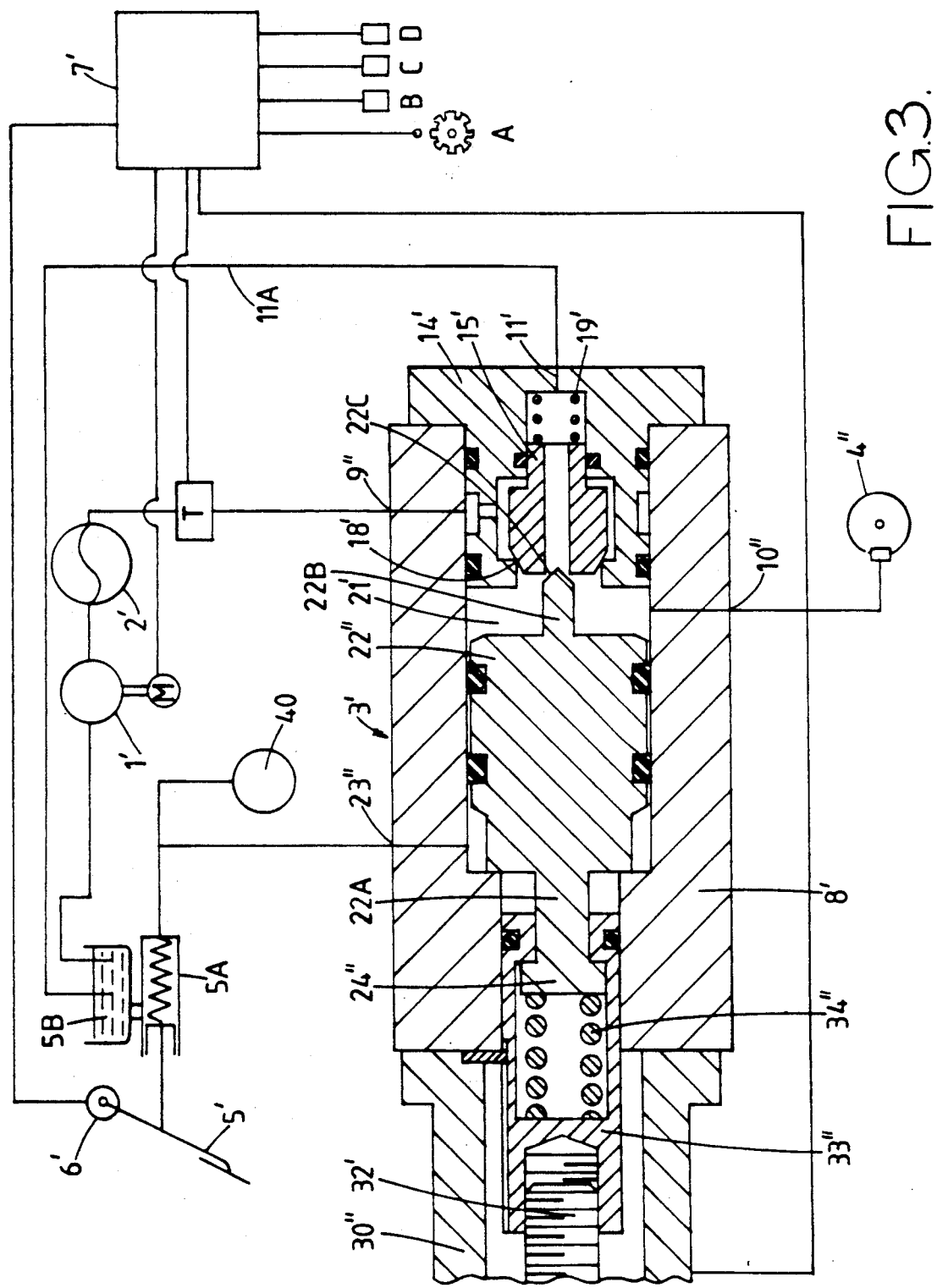
FIG. 3 is a cross-sectional view of another alternative embodiment of the fluid control device incorporated in a fluid pressure operated braking system in accordance with the invention.

FIG. 3 illustrates a hydraulic braking system incorporating a further alternative embodiment of the control device of the invention designed to be operated hydraulically. In this system, a hydraulic accumulator 2' is charged by a pump 1' driven by a motor M. A pressure transducer T is placed in the output line of the accumulator and is connected to the main control unit 7', to which it supplies signals indicating respectively maximum and minimum pressure values required for the accumulator. The motor 1' is also connected to the control unit 7' and is switched on and off so as to maintain the accumulator pressure between predetermined minimum and maximum levels. Fluid from the reservoir 2' is supplied via the control device 3' to one or more brake actuators represented at 4". The system is actuated by a driver operated pedal 5' which operates a transducer 6' providing an electrical output varying with pedal displacement and/or load which is supplied to the controller 7'. The pedal also operates an hydraulic master cylinder 5A to which fluid is supplied from a reservoir 5B, from which fluid is also drawn by the pump 1' to charge the accumulator 2'. The body 8' of the control device has a fluid inlet 9" connected to the hydraulic accumulator 2', a fluid outlet 10" connected to the brake actuator 4" and an exhaust passage 11' which is connected via a return line 11A to the reservoir 5B. The body 8' forms a chamber 21" within which slides a main piston 22', of which a reduced diameter axial extension 22A is provided with a head 24". As in the previous embodiment, a thrust member 33" is driven by a threaded shaft 32' of a stepper motor 30", the member 33" having a hollow portion which houses the head 24" of the piston 22" and contains a spring 34" via which drive is imparted from the thrust member 33" to the piston.

The end of the piston 22" remote from the head 24" is provided with an axial projection 22B, the free end of which is beveled to form a valve seat 22C. The end of the body 8' remote from the stepper motor is closed by a generally cylindrical part 14' which houses a valve member 15' urged by a spring 19' against a valve seat 18' formed by the part 14'.

Operation of this hydraulic system is similar to the pneumatic versions described above. Depression of the pedal 5' causes fluid to be supplied from the master cylinder 5A through the inlet 23" of the control device, thereby applying a pilot pressure to the piston 22". Simultaneously, the transducer 6' supplies a pedal load and/or displacement dependent signal to the controller 7' which provides a drive signal to the motor 30". This may also be dependent upon other vehicle operational parameters A,B,C,D, as described previously. The valve seat 22C engages the member 15' and displaces this from the valve seat 18', permitting direct communication between the accumulator 2' and brake actuator 4". Reversal of the motor first relieves the load in spring 34" and then causes the thrust member 33" to exert a pull on the head 24', causing the piston to retract against the action of the spring 34", thereby reversing the condition of the aforesaid valves and connecting the brake actuator 4" to the reservoir 5B via the exhaust passage 11".

The master cylinder 5A may be connected to one or more additional brakes or valves 40 which would then enable some braking to be retained in the event of failure of the electrical power supply, for example. A similar facility could be provided in the embodiments of FIGS. 1 and 2 by connecting the pilot air pressure to one or more additional brakes or valves.

I claim:

1. A fluid control device comprising:
   a first fluid flow path having fluid inlet port means and fluid outlet port means;
   first valve means for controlling fluid flow in said first flow path between said inlet and outlet port means;
   a second fluid flow path including said fluid outlet port means and an exhaust port means;
   second valve means for controlling fluid flow in said second flow path between said outlet port means and said exhaust port means;
   a movable valve control member operatively associated with said first and second valve means so that movement of said valve control member in one direction operates said first valve means to allow fluid pressure to be applied through said first flow path from said fluid inlet port means through said outlet port means, and movement of said valve control member in a direction reverse to said one direction causes said second valve means to operate to allow fluid pressure to be applied through said second flow path from said outlet port means through said exhaust port means;
   electrical stepper motor means operatively connected to said valve control member for positively moving said valve control member in both of said one and reverse directions; and
   control signal means operatively connected to said stepper motor means for operating said stepper motor means and controlling said movements of said valve control member.

2. A fluid control device as claimed in claim 1 and further comprising:
   means for actuating said valve control member by control pressure acting in parallel with said stepper motor means in response to operator demands.

3. A fluid control device as claimed in claim 2 wherein: said valve control member comprises a piston means; and said control pressure is applied to said piston means.

4. A fluid control device as claimed in claim 2 wherein:
   said control signal means is dependent upon operator demand; and
   when said first valve means is open to allow fluid pressure to be applied through said first flow path, said control pressure is applied to said valve control member in a direction opposite to that applied to the valve control member by the fluid pressure in said first flow path.

5. A fluid control device as claimed in claim 1 wherein:
said control signal means is dependent upon operator demand.

6. A fluid control device as claimed in claim 1 wherein:
said control signal means is dependent upon a system operational parameter.

7. A fluid control device as claimed in claim 1 wherein:
said valve control member comprises resilient means for driving said valve control member in said one direction.

8. A fluid control device as claimed in claim 7 wherein:
said valve control member further comprises a first element driven linearly by rotation of said stepper motor means and a second control element; and
said resilient means comprises spring means interposed between said first and second elements.

9. A fluid control device as claimed in claim 8 wherein:
said resilient means is engaged between said first element and a portion of said second element; and
said portion of said second element engages a surface of said first element, so that movement of said valve control member by said stepper motor means in said reverse direction opens said second valve means to allow fluid pressure to be applied through said exhaust port means.

10. A fluid control device as claimed in claim 8 and further comprising:
first element support means slidably disposed in said second control element for supporting said first element on said second control element; and
abutment means between said first element support means and said second control element so that movement of said valve control member by said stepper motor means in said reverse direction opens said second valve means to allow fluid pressure to be applied through said exhaust port means.

11. A fluid control device as claimed in claim 10 wherein:
said second control element comprises a piston having a piston head and a smaller diameter stem;
said first element support means is slidably disposed in said smaller diameter stem adjacent said piston head; and
said first element is slidably engaged in said smaller diameter stem remote from said piston head.

12. A fluid control device as claimed in claim 1 wherein:
said first and second valve means comprise a common valve element on which parts of said first and second valve means are disposed so that movement of said valve control member in said one direction engages said valve control member with said common valve element to close said second valve means, and further movement of said valve control member in said one direction displaces said common valve element to open said first valve means.

13. A fluid operated braking system comprising:
a source of pressurized fluid;
a fluid control device having a fluid inlet port connected to said source of pressurized fluid, a fluid outlet port and an exhaust port;
at least one brake actuator means connected to said fluid outlet port;
a first fluid flow path between said inlet and outlet ports;
a second fluid flow path between said outlet and exhaust ports;
a first valve means normally interrupting said first flow path;
a second valve means in said second fluid flow path;
a valve control member in said fluid control device operatively associated with said first and second valve means for controlling the operation of said first and second valve means;
an electrical stepper motor operatively connected to said valve control member for positively driving said valve control member in a first direction and a second direction opposite to said first direction; and
an electronic controller means operatively connected to said stepper motor and adapted to receive electrical signals representing operator demand and at least one operational parameter for transmitting corresponding motive signals to said stepper motor for driving said valve control member in said first and second directions to produce actuation of said first and second valve means and control operation of said at least one brake actuator.

14. A fluid operated braking system as claimed in claim 13 wherein:
said valve control member comprises a piston means; and
a control pressure means is provided for applying a force on said piston means in parallel with force applied to said valve control member by said stepper motor.

15. A fluid operated braking system as claimed in claim 14 wherein:
said control pressure means comprises a user operated hydraulic mater cylinder for supplying control pressure to said piston means.

16. A fluid operated braking system as claimed in claim 14 wherein:
said control pressure means comprises a user operated control valve for supplying control pressure to said piston means.

17. A fluid operated braking system as claimed in claim 16 and further comprising:
external control means for operating said user operated control valve; and
a transducer device operatively associated with said external control means for providing an electrical signal representing operating displacement of said external control means, said signal being fed to said controller to modify said motive signals transmitted to said stepper motor.

* * * * *